(12) United States Patent
Zanini et al.

(10) Patent No.: US 7,837,026 B2
(45) Date of Patent: Nov. 23, 2010

(54) EQUIPMENT FOR PROCESSING CONTAINERS FILLED WITH LIQUID OR POWDER PRODUCTS

(75) Inventors: Gianpietro Zanini, Montanara di Curtatone (IT); Marco Baroni, Barbasso di Roncoferraro (IT)

(73) Assignee: Azionaria Costruzioni Macchine Automatiche A.C.M.A. S.p.A. (IT)

( * ) Notice: Subject to any disclaimer, the term of this patent is extended or adjusted under 35 U.S.C. 154(b) by 263 days.

(21) Appl. No.: 12/223,190

(22) PCT Filed: Feb. 14, 2007

(86) PCT No.: PCT/IB2007/000336

§ 371 (c)(1),
(2), (4) Date: Jul. 24, 2008

(87) PCT Pub. No.: WO2007/093884

PCT Pub. Date: Aug. 23, 2007

(65) Prior Publication Data

US 2010/0147653 A1    Jun. 17, 2010

(30) Foreign Application Priority Data

Feb. 14, 2006   (IT) .......................... B02006A0109

(51) Int. Cl.
  *B65G 29/00* (2006.01)
(52) U.S. Cl. ................ 198/478.1; 198/495; 141/13; 141/115

(58) Field of Classification Search ................. 198/493, 198/495, 478.1; 134/48, 80, 103.1, 155; 141/13, 115, 237; 248/131, 132
See application file for complete search history.

(56) References Cited

U.S. PATENT DOCUMENTS

| | | | | |
|---|---|---|---|---|
| 1,835,676 A | * | 12/1931 | Scholz et al. | 141/115 |
| 2,118,436 A | * | 5/1938 | Kantor | 141/13 |
| 2,122,150 A | | 6/1938 | Lippold | |
| 2,548,589 A | * | 4/1951 | Chelle | 141/48 |
| 2,597,791 A | | 5/1952 | Graham-Enock | |
| 2,762,545 A | | 9/1956 | Breeback | |
| 3,227,168 A | | 1/1966 | Wright | |
| 4,749,107 A | * | 6/1988 | Stover | 141/115 |
| 2003/0075547 A1 | | 4/2003 | Stocchi | |

FOREIGN PATENT DOCUMENTS

| | | |
|---|---|---|
| DE | 1 012 536 | 7/1957 |
| EP | 0 903 294 A1 | 3/1999 |
| NL | 75 698 C | 8/1954 |

* cited by examiner

*Primary Examiner*—James R Bidwell
(74) *Attorney, Agent, or Firm*—Timothy J. Klima; Shuttleworth & Ingersoll, PLC

(57) ABSTRACT

Containers (2) to be filled with liquid or powder products are processed by equipment (1) comprising at least one carousel (5) mounted on a floor-standing base frame (10) and set in rotation about a vertical axis (X) by drive components (9) housed internally of the frame (10); the carousel (5) is equipped with a number of peripheral stations (6), each accommodating a single container (2), and is positioned directly above a tank (20) with an open top (27) proportioned and contoured in such a way that washing liquids sprayed onto the carousel (5) in the course of during cleaning operations can be collected and carried away from the equipment.

24 Claims, 6 Drawing Sheets

EQUIPMENT FOR PROCESSING CONTAINERS FILLED WITH LIQUID OR POWDER PRODUCTS

This application is the National Phase of International Application PCT/IB2007/000336 filed Feb. 14, 2007 which designated the U.S. and that International Application was published under PCT Article 21(2) in English.

TECHNICAL FIELD

The present invention relates to equipment for processing containers filled with liquid or powder products.

The invention finds application advantageously in the art field of carousel type equipment used for sterilizing, filling and closing containers in which a variety of different substances can be packaged, for example liquid food products such as milk or fruit juices, and non-food products such as mineral lubricating oils, detergents, etc.

BACKGROUND ART

Carousel equipment of conventional design comprises a bed consisting of a single unit preassembled at the premises of the constructor and presenting a plurality of bays serving to accommodate respective carousels on which the containers are processed, that is to say, for example, sterilized, filled with a selected product and closed with a cap. Also mounted to the bed are devices for transferring the containers from one carousel to the next, as well as infeed and outfeed devices with relative motors, or a single motor, by which the containers are conveyed into and directed away from the train of carousels.

The prior art also embraces equipment wherein each carousel is equipped with a respective base frame housing the devices by which the single carousel is set in motion.

In equipment of this type, the carousels are linked one to another by transmission components such as will transfer motion from a single motor to the rotating shafts of the individual carousels.

Conventional units of the type outlined above are washed down periodically so as to remove any spills or splashes of the liquid or powder products with which the containers are filled. During the course of feeding and/or filling operations, in effect, part of the liquid or powder product can escape from the containers and drop onto the surfaces of the carousels.

At the end of a given production run, accordingly, nozzles are activated to direct a washing liquid onto the carousel, especially onto those areas where the spills or splashes are most heavily concentrated.

The washing process in question is a cause of major drawbacks however, due to the infiltration of liquid into the transmission components of the carousels.

In effect, infiltrations of liquid can damage the devices housed in the base frame, with the result that the drive lines to the respective carousels are caused to malfunction.

It will be appreciated also that the carousels are equipped with numerous electronic components easily damaged by contact with liquid products. For example, such electronic components are utilized in the rotary mechanisms by which caps or tops are screwed onto single containers, and in the weight-check devices installed and operating in the revolving stations of carousel filling units.

Another drawback derives from the fact that the washing liquid projected onto the equipment is not collected and carried away during the cleaning operation. Consequently, wet and damp patches form in the area around the equipment and on the flat surfaces of the single carousels, which can damage the products batched into the containers. In effect, an excessively damp environment can affect the properties of products batched into the containers, especially if these happen to be powders capable of absorbing water droplets.

Moreover, given the high speeds of rotation at which the carousels in question operate, any liquid left on the rotating surfaces following completion of the washing step is flung outwards, wetting the area around the equipment.

The object of the present invention is to provide equipment for processing containers filled with liquid or powder products, such as will be unaffected by the drawbacks mentioned above.

In particular, the object of the invention is to embody equipment for processing containers filled with liquid or powder products in such a way that washing operations will damage neither the equipment itself, nor the products batched into the containers.

DISCLOSURE OF THE INVENTION

The stated object is realized, according to the present invention, in equipment for processing containers filled with liquid or powder products, comprising: at least one carousel presenting a plurality of peripheral stations serving to accommodate respective containers for processing, and rotatable about a respective vertical axis; means by which motion is induced in the at least one carousel; and at least one floor-standing base frame on which the carousel is mounted and in which the motion-inducing means are housed, characterized in that it further comprises at least one collection tank associated with the bottom of the carousel and presenting an open top directed toward the selfsame carousel, in which to collect and carry away washing liquids projected onto the at least one carousel.

The invention will now be described in detail, by way of example, with the aid of the accompanying drawings, in which.

Figure 1:
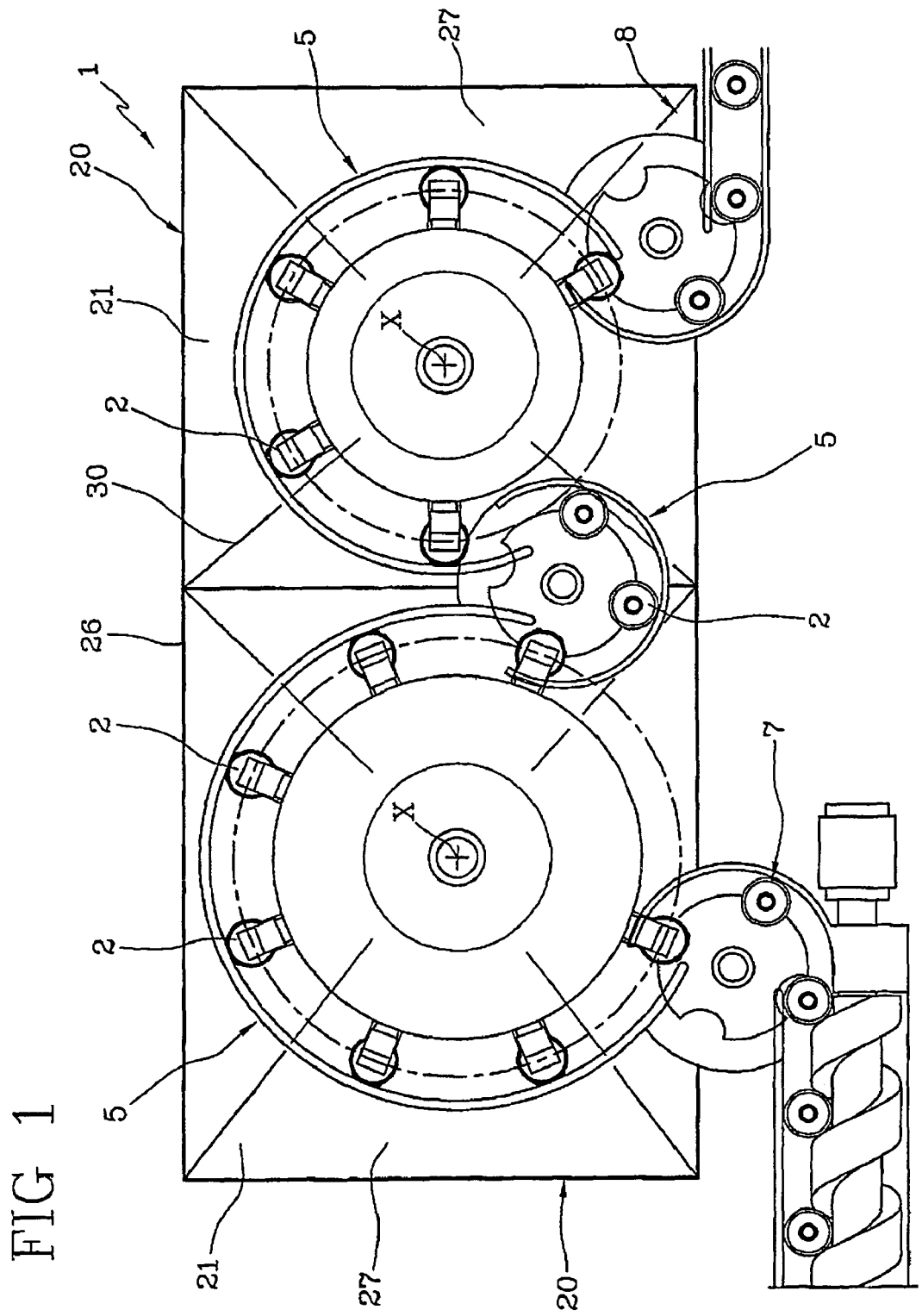
FIG. 1 illustrates equipment according to the present invention for processing containers filled with liquid or powder products, viewed in plan from above.
Figure 4:
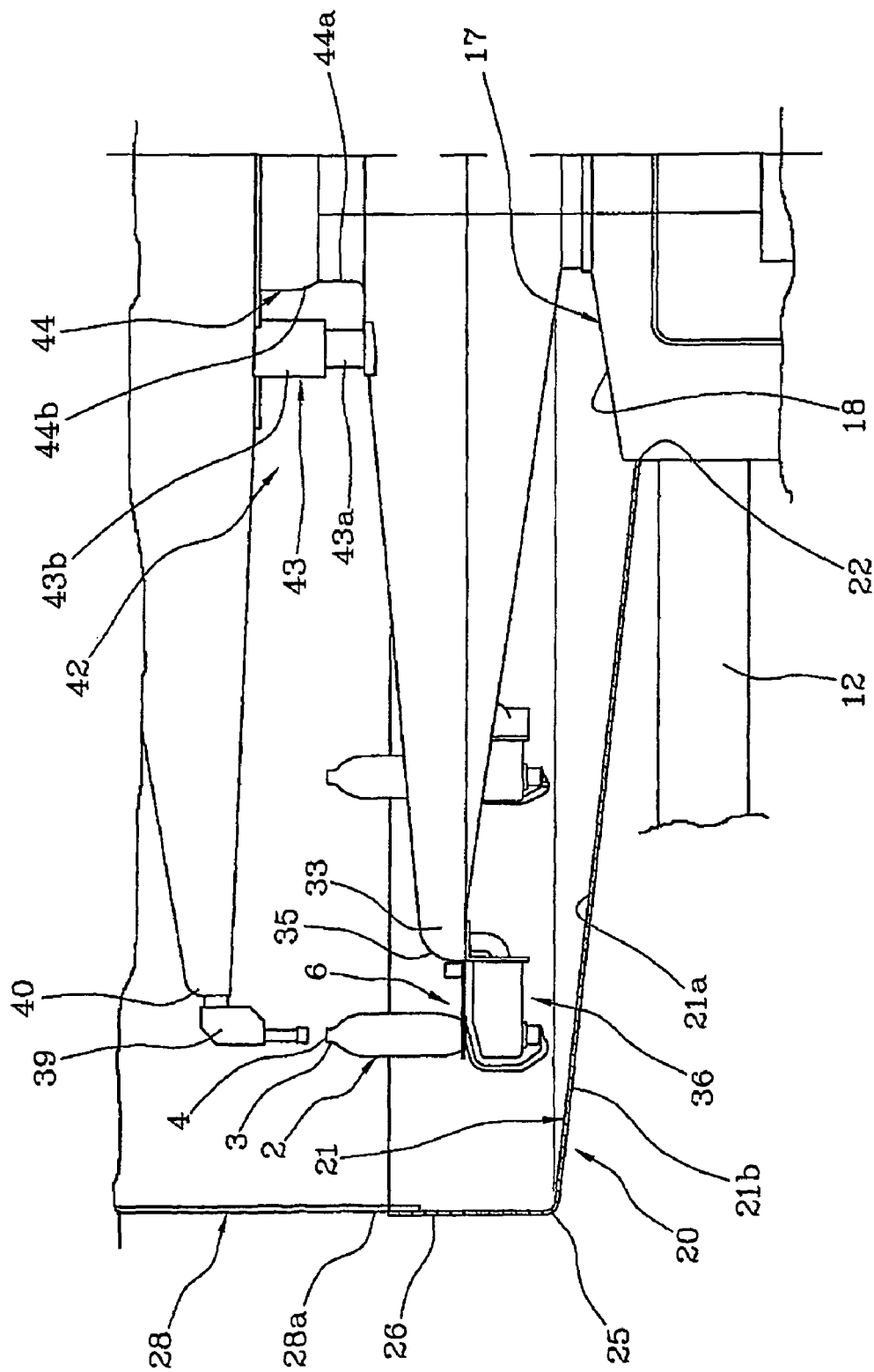
FIG. 4 is an enlarged view of a constructional detail illustrated in FIG. 2.

With reference to FIG. 1, numeral 1 denotes equipment, considered in its entirety, for processing containers 2 filled with liquid or powder products, each presenting a neck 3 and a filler mouth 4 closed by fitting a cap (as illustrated in the enlargement of FIG. 4).

In general, such equipment 1 comprises at least one carousel 5 for processing containers 2, operated for example as a sterilizing, filling or capping unit, presenting a plurality of peripheral stations 6 accommodating respective containers 2 and set in rotation about a vertical axis X.

In the example of FIG. 1, the equipment 1 comprises a plurality of carousels 5 positioned between a container infeed device 7 of conventional type (not illustrated in detail), and a container outfeed device 8, likewise conventional.

It will be seen that the equipment 1 illustrated by way of example in the accompanying drawings comprises a filling carousel, a capping carousel and respective transfer carousels, albeit the carousels effectively utilized could be of any given number and type, depending on production requirements.

Figure 2:
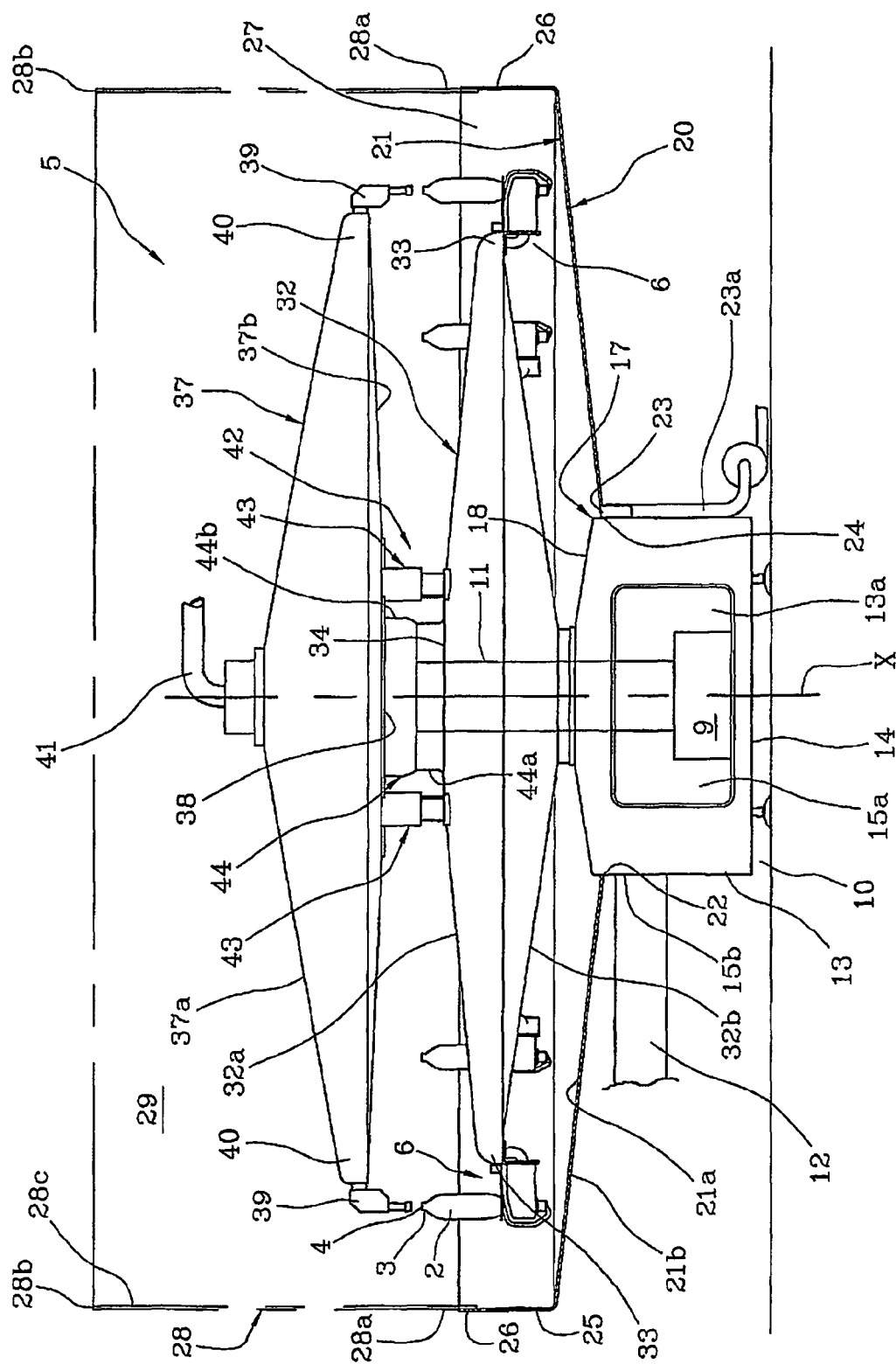
FIG. 2 is a detail of the equipment in FIG. 1, viewed in side elevation and partly in section.

The detailed illustration of FIG. 2 relates, by way purely of example, to a carousel utilized for filling containers 2 with liquid or powder products. Nonetheless, the feature to which the invention relates is applicable to any given carousel forming part of the equipment 1.

Each carousel 5 is equipped with motion-inducing means 9 housed preferably in a respective floor-standing base frame 10 on which the entire carousel 5 is mounted.

In detail, such motion-inducing means 9 comprise a vertical shaft 11, illustrated schematically in FIG. 2 and rotatable about the aforementioned vertical axis X. The shaft 11 can be connected directly to a respective motor (not illustrated in the drawings) housed similarly in the base frame 10. Alternatively, the shafts 11 of the carousels 5 installed in the equipment 1 can be connected one with another by way of transmission components 12 indicated schematically in the drawings, being conventional in embodiment, for example as disclosed in European Patent application EP06112670.2 filed by the present applicant, and capable of transmitting motion from at least one motor to the single shaft 21 of each carousel 5.

Figure 3:
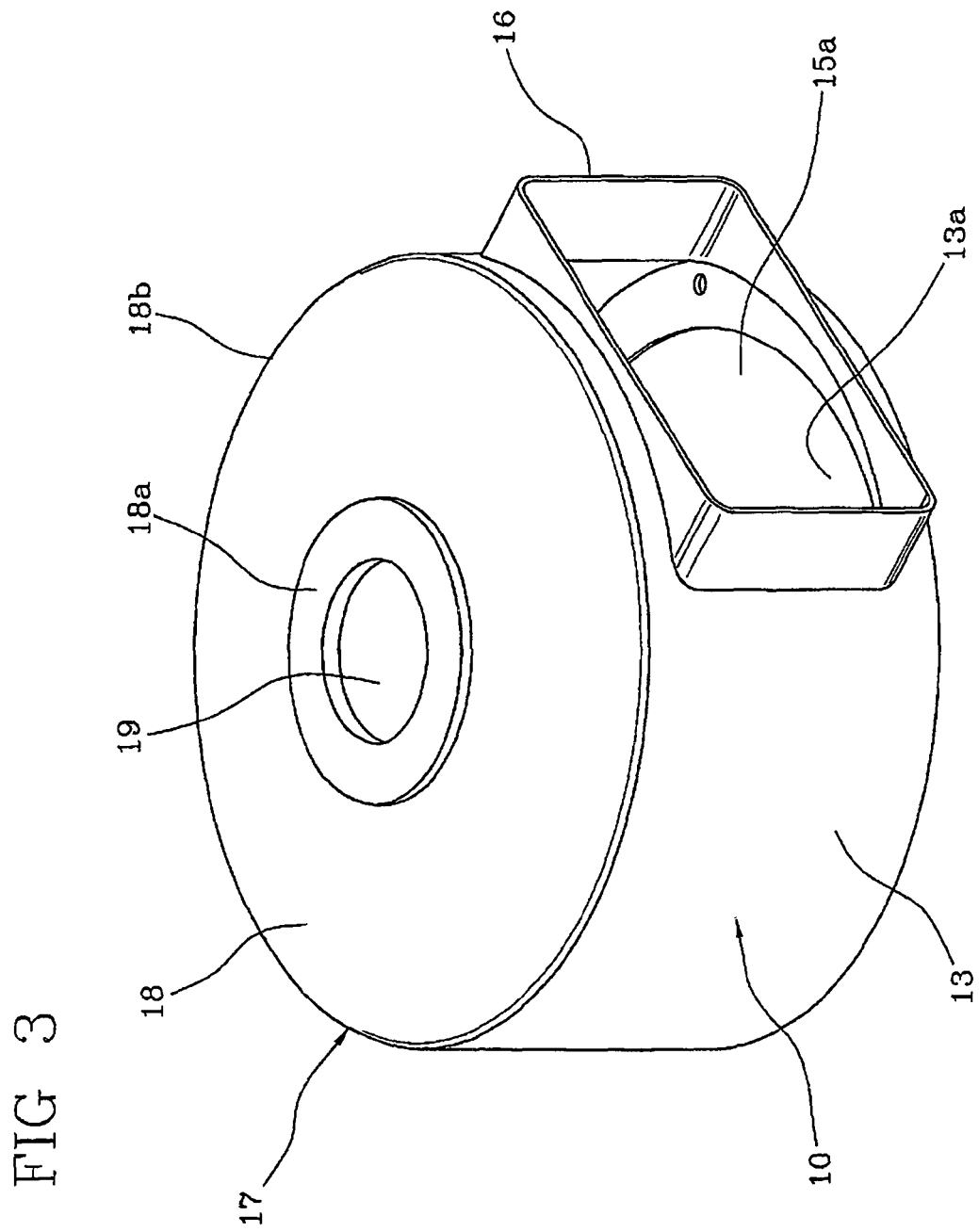
FIG. 3 shows a constructional detail of FIG. 2, viewed in perspective.

As illustrated to better advantage in FIG. 2 and in the detail of FIG. 3, the base frame 10 presents a substantially cylindrical body 13 delimiting an enclosure 13a in which the motion-inducing means 9 are housed.

In particular, the cylindrical body 13 comprises a floor-standing base 14 of circular outline, and a side wall 15 of planar embodiment rising vertically from the base 14. The side wall 15 is furnished with an opening 15a affording access to the inside of the enclosure 13a. The preferred opening 15a presents a substantially rectangular peripheral outline and is framed by a flange 16, extending fully around the selfsame peripheral outline of the opening 15a and projecting from the side wall 15. In other words, the flange 16 forms a hatchway of rectangular cross section around the opening 15a, providing access to the enclosure 13a.

The size of the opening 15a is such as to afford ease of access to the enclosure 13a for an operator needing to work on the motion-inducing means 9.

The side wall 15 might also present an auxiliary opening 15b through which to route the aforementioned transmission components 12 connecting the motion-inducing means 9, as described previously.

The cylindrical body 13 terminates uppermost in a top end 17 that consists in a casing surface 18 presenting a central area 18a with a hole 19 such as will afford a passage for the shaft 11, which extends in part through the enclosure 13a and in part externally of the base frame 10 (FIG. 2).

Importantly, and as shown to advantage in FIGS. 2 and 4, the casing surface 18 is pitched, sloping downward from the aforementioned central area 18a toward a peripheral area 18b along which it is joined to the side wall 15. Thus, any residual washing liquid lying on the casing surface 18 will run off down the selfsame surface 18 toward the side wall 15.

The equipment 1 also comprises a collection tank 20 located beneath the single carousel 5 and presenting an open top 27 positioned so as to catch any washing liquids falling from the carousel 5.

In practice, each carousel 5 is furnished with such a tank 20, of which a bottom wall 21 extends around the vertical axis X, establishing a concave inner surface 21a directed toward the carousel and a convex outer surface 21b directed toward the base frame 10, and in particular toward the floor-standing base 14.

In detail, the bottom wall 21 presents an internal edge 22 of annular geometry engaging in fluid-tight contact with the side wall 15 of the base frame 10. As clearly discernible from FIGS. 2 and 6, the internal edge 22 is associated with a top part of the cylindrical body 13, in such a manner that the top end 17 of the cylindrical body 13 projects above the inner surface 21a whilst the remainder of the body 13 is positioned below the outer surface 21b.

To reiterate, the inner surface 21a is essentially concave, angled downward from the periphery and toward the internal edge 22. The bottom wall 21 also presents a drain outlet 23 located near the internal edge 22 and associated with a drain pipeline 23a. Accordingly, any liquid contained in the tank 20 will be carried naturally by the concave inner surface 21a toward the outlet bowl 23 and into the pipeline 23a, along which it flows to a collection vessel not illustrated in the accompanying drawings.

Observing FIG. 4, it will be seen that the plane occupied by the internal edge 22 is skew relative to the horizontal plane on which the base frame 10 lies. More precisely, the plane occupied by the internal edge 22 is angled toward the drain outlet 23, transversely to the vertical axis X.

With this arrangement, the drain outlet 23 will be positioned in a lower part 24 of the bottom wall 21, closer to the base 14, that is to say nearer to the datum level on which the base frame 10 stands.

The part of the tank lying remote from the internal edge 22 consists in a peripheral portion 25 rising vertically from the bottom wall 21 and presenting a peripheral edge 26.

As illustrated in FIGS. 1 and 2, the peripheral edge 26 fully encompasses the horizontal dimensions of the carousel, delimiting an open top 27 into which washing liquid falls from above and into which the top end 17 of the base frame 10 extends from beneath.

The cross sectional dimension presented by the cylindrical body 13 of the base frame 10 is smaller, preferably by half, than the corresponding overall dimension of the tank 20.

Moreover, the peripheral edge 26 and therefore the entire bottom wall 21 can present any given outline or contour; in the example of FIG. 1, the bottom wall 21 is illustrated with a substantially square peripheral outline.

As illustrated in the detail of FIGS. 2 and 4, the peripheral portion 25 of the bottom wall 21 can be associated with a casing panel 28. The panel 28 in question extends vertically along the entire length of the peripheral edge 26, enclosing the relative carousel 5. More particularly, the panel 28 presents a bottom edge 28a attached by means of conventional hardware (not illustrated) to the peripheral edge 26, and a top edge 28b opposite to the bottom edge 28a, disposed at a level above the carousel 5 (FIG. 2). Also, the panel 28 presents an inside surface 28c directed toward the carousel 5 and combining with the bottom wall 21 to create an enclosure 29 such as will contain both the carousel 5 and the washing liquid projected onto which the carousel in the course of cleaning operations shortly to be described.

Figure 6:
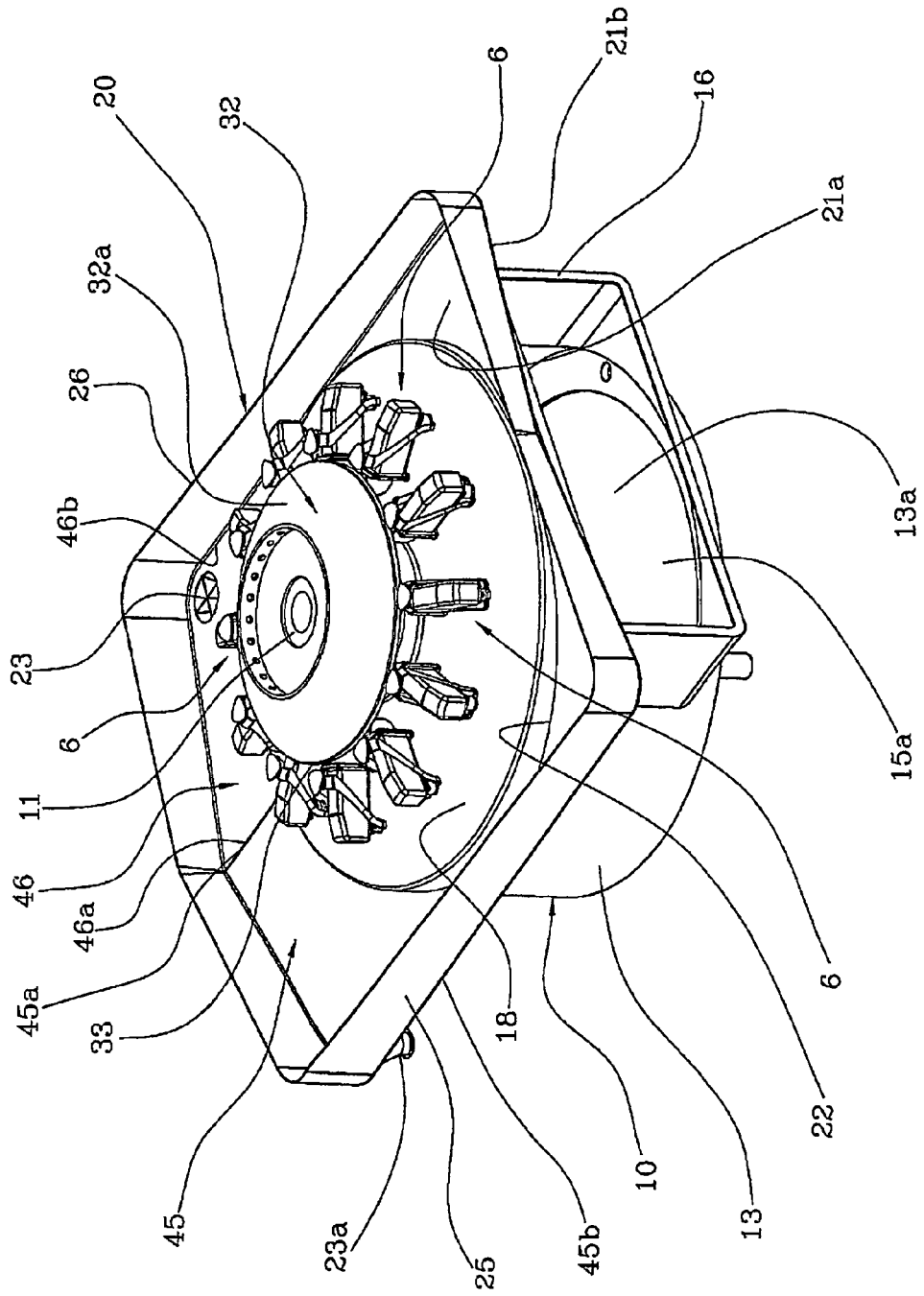
FIG. 6 shows a constructional detail of FIG. 2, viewed in perspective with certain parts omitted better to reveal others and illustrated in a further embodiment.

Referring to the embodiment of FIG. 6, it will be seen that the bottom wall 21a can be composed of two inclined portions 45 and 46 matched together along respective top edges 45a and 46a.

In particular, the two portions 45 and 46 occupy respective planes set transversely one to another, each angled downward from the respective top edge 45a and 46a toward a bottom edge 45b and 46b. In this situation, the two portions 45 and 46 mirror one another positionally, with the joined top edges 45a and 46a occupying a central area of the tank 20. Drain outlets 23 are located at each of the bottom edges 45b and 46b, in such a way that liquid in the tank 20 is directed down toward the selfsame bottom edges 45b and 46b into the respective outlets 23.

In the preferred embodiment of FIGS. 1 to 4, the filling and capping carousels 5 each present a respective base frame 10 and a respective tank 20. Thus, as discernible in FIG. 1, the peripheral edges 26 are connected one to another in fluid-tight association by means of conventional hardware neither described nor illustrated. The bottom walls 21 of the two tanks 20 combine to create a casing surface 30 that compasses the entire horizontal area occupied by all carousels 5 making up the equipment 1.

In this situation, moreover, the aforementioned transmission components 12 are located beneath the bottom walls 21 and consequently shielded from the washing liquid directed onto the carousels 5.

Figure 5:
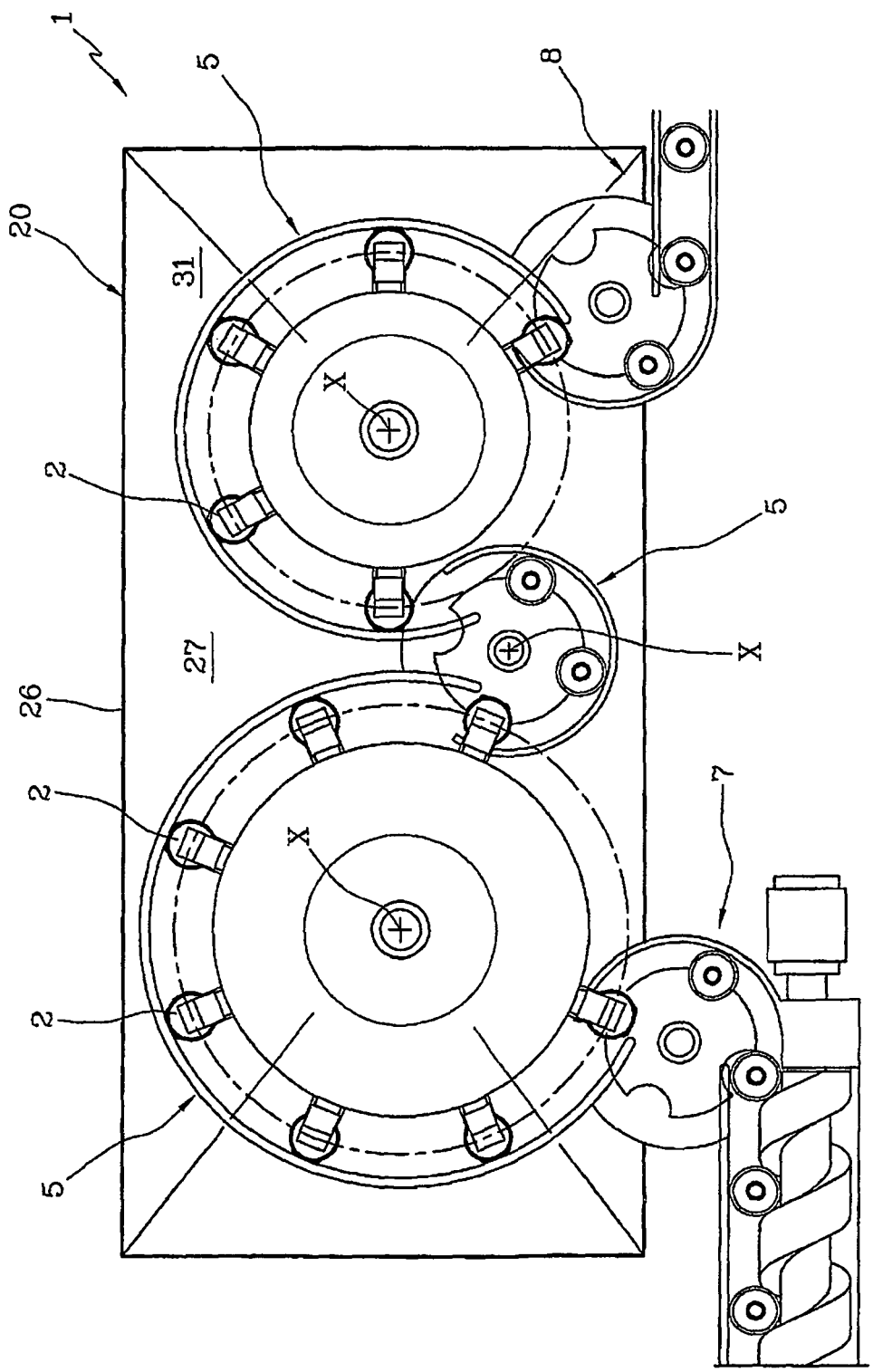
FIG. 5 shows a second embodiment of equipment for processing containers according to the invention, viewed in plan from above.

In the alternative embodiment of FIG. 5, the carousels 5 are mounted to a single base frame 31 consisting of just one unit internally of which all the motion-inducing components for each carousel are housed. In this instance, the base frame can be provided with a single tank 20 compassing the entire horizontal area occupied by the equipment 1.

Alternatively, each of the carousels mounted to the single base frame 31 could be provided with a separate tank, as in the first embodiment, in which case each tank 20 will surround the shaft 11 of the relative carousel 5.

Each carousel 5 presents a respective revolving support, embodied as a plate 32 of which a peripheral rim 33 carries the stations 6 for the containers 2.

Whatever the type and function of the carousel 5 installed in the equipment 1, the revolving plate 32 presents a cross section of substantially rhomboid geometry and is keyed to the respective shaft 11 which, as mentioned above, projects upward from the top end 17 of the base frame. The revolving plate 32 presents a substantially conical top surface 32a, tapering upward, and a substantially conical bottom surface 32b opposite to the top surface 32a, tapering downward and directed toward the inner surface 21a presented by the bottom wall 21 of the tank.

In practice, the top surface 32a extends downwardly angled from a central area 34 of the plate 32, associated with the shaft 11, toward the peripheral rim 33. Conversely, the bottom surface 32b extends downwardly angled from the peripheral rim 33 toward the central area 34 of the plate 32.

In this situation, washing liquids deposited on the revolving plate 32 are able to run down the inclined surfaces 32a and 32d and drop through the open top 27 of the tank.

As illustrated to advantage in FIG. 4, the top surface 32a also presents a connecting portion 35 located at the peripheral rim 33, by which the top surface 32a and the bottom surface 32b are joined. More exactly, the connecting portion 35 presents a substantially arcuate cross sectional profile, over which a washing liquid falling on the top surface 32a will run off into the tank 20 beneath the plate 32.

As already intimated, purely by way of example and with no limitation implied, the carousel of FIGS. 2 and 4 is shown as a filling and/or capping unit.

The carousel 5 is furnished with supporting and weighing means 36, indicated schematically by reason of their being familiar as prior art, disclosed for example in European Patent no 790183 published in the name of the present applicant, such as will support and weigh a plurality of containers 2 being filled with a product while advancing along a circular path extending around the vertical axis X of rotation. Such supporting and weighing means 36 are installed at each of the peripheral stations 6 accommodating the containers 2.

Located above the revolving support plate 32 is a rotary filling and/or capping plate 37, associated likewise with the aforementioned shaft 11 by way of a respective central area 38.

The rotary filling and/or capping plate 37 presents a plurality of dispensing and/or closing devices 39, each positioned above a relative peripheral station 6 and operating on a respective container 2.

Each of the dispensing and/or closing devices 39 is designed, depending on the type of carousel 5, to direct a given product into a respective container 2 placed on the supporting means 36 in the course of their passage around the axis X of rotation, and/or to close the container with a relative cap.

Like the support plate 32, the rotary filling and/or capping plate 37 presents a substantially rhomboid appearance when viewed in cross section.

More exactly, the filling and/or capping plate 37 presents a top surface 37a, and a bottom surface 37b opposed to the top surface 37a, of which the bottom surface 37b is directed toward the top surface 32a of the plate 32 beneath.

In particular, the top surface 37a presents a respective central area 38 accommodating a connecting pipeline 41, conventional in embodiment and therefore not described in detail, through which the liquid or powder product is delivered to the aforementioned dispensing devices 39.

Alternatively, the carousel might be equipped with a feed tank containing the liquid or powder product, positioned on the top surface 37a and connected to the dispensing devices 39.

The top surface 37a appears substantially conical, presenting an upward taper, that is to say angled downward from the central area 38 toward a relative peripheral area 40 around which the dispensing and/or closing devices 39 are located. Similarly, the bottom surface 37b is angled downward from the peripheral area 40 toward the central area 38.

In addition, and as illustrated in FIG. 2, the carousel 5 can be equipped with a device 42 inducing vertical motion, associated with the revolving support plate 32 and with the rotary filling and/or capping plate 37, by which the one plate 37 is moved toward and away from the other plate 32.

In particular, the device 42 comprises a set of pneumatic cylinders 43, each having a first end 43a associated with the top surface 32a of the support plate 32, and a second end 43b, opposite to the first end 43a, associated with the bottom surface 37b of the filling and/or capping plate 37. The first and second ends 43a and 43b are coupled in fluid-tight association, with the first end 43a insertable in the second end 43b.

Thus, by operating the cylinders 43, the filling and/or capping plate 37 can be moved toward or away from the support plate 32, and its position adapted thus to the size of the containers 2 carried by the plate 32.

In addition, the vertical motion-inducing device 42 comprises a telescopic casing element 44 of tubular embodiment positioned around the shaft 11, between the support plate 32 and the filling and/or capping plate 37.

The telescopic casing element 44 presents a first portion 44a of annular embodiment associated with the support plate 32, and a second portion 44b likewise of annular embodiment, associated with the filling and/or capping plate 37.

The first portion 44a is smaller than the second portion 44b, and insertable therein. Furthermore, the first and second portions 44a and 44b are coupled in fluid-tight association to prevent any infiltration of washing liquid.

In a preferred embodiment, the equipment 1 can also be associated with a device such as will deliver a washing liquid, conventional in embodiment and therefore not illustrated in the drawings. Washing liquid will be projected by the device onto all of the carousels 5 that need to be cleaned of any residual liquid or powder product escaping from the containers 2.

Any washing liquid falling on the pitched surfaces of the plates 32 and 37 utilized in the carousels 5 will run off into the respective collection tank 20 beneath, so that the base frame 10 beneath the tank remains completely dry.

Finally, it will be observed that with the bottom wall 21 of the tank 20 likewise presenting a pitched inner surface 21a, all the washing liquid will be carried naturally toward the drain outlet 23 leaving no damp patches on the selfsame surface 21a.

The invention claimed is:

1. Equipment for processing containers filled with at least one of liquid and powder products, comprising:
   at least one carousel having a plurality of peripheral stations serving to accommodate respective containers for processing, and rotatable about a respective vertical axis;
   a mechanism for inducing motion in the at least one carousel;
   at least one base frame on which the carousel is mounted, and in which the mechanism for inducing motion is housed, and
   a collection tank associated with a bottom of the carousel and having an open top directed toward the carousel, in which to collect and carry away washing liquids projected onto the at least one carousel; the collection tank including a bottom wall extending around the vertical axis; the bottom wall including an internal edge engaging in fluid-tight contact with the base frame; the internal edge occupying a plane inclined relative to a horizontal plane, and the drain outlet being located adjacent to the internal edge in a lower part of the bottom wall, nearer to a datum level on which the base frame stands.

2. Equipment as in claim 1, wherein the collection tank comprises a peripheral edge delimiting the open top and fully encompassing horizontal dimensions of the carousel.

3. Equipment as in claim 2, wherein the bottom wall comprises a concave inner surface inclined toward a drain outlet located in the bottom wall, in such a way that washing liquids falling on the inner surface are carried toward the outlet.

4. Equipment as in claim 3, wherein the bottom wall further comprises a convex outer surface, directed toward the base frame and positioned above the mechanism for inducing motion.

5. Equipment as in claim 4, wherein the bottom wall includes a peripheral portion lying remote from the internal edge and rising vertically from the inner surface of which a topmost extremity defines the peripheral edge.

6. Equipment as in claim 5, further comprising at least one casing panel having a bottom edge attached to the peripheral edge, and a top edge opposite to the bottom edge, disposed at a level above the carousel.

7. Equipment as in claim 6, wherein the at least one casing panel includes a planar and substantially vertical inside surface directed toward the carousel, combining with the bottom wall to create an enclosure such as will contain the at least one carousel.

8. Equipment as in claim 7, wherein the base frame comprises a substantially cylindrical body terminating uppermost in a top end occupying the open top of the tank and having a casing surface directed toward the carousel, angled downward from a respective central area toward a peripheral area in such a way as will allow any washing liquids falling on the casing surface to run off into the tank.

9. Equipment as in claim 8, wherein the carousel comprises at least one revolving support plate to which the peripheral stations accommodating the containers are mounted by way of a respective peripheral rim, and a top surface angled downwardly from a respective central area toward the peripheral rim.

10. Equipment as in claim 9, wherein the revolving support plate also includes a bottom surface opposite to the top surface, angled downwardly from the peripheral rim toward the central area, and the mechanism for inducing motion comprises a vertical rotating shaft associated with the central area of the revolving support plate.

11. Equipment as in claim 10, wherein the plate has a cross section of substantially rhomboid geometry.

12. Equipment as in claim 11, wherein the top surface also includes, a connecting portion fashioned with an arcuate profile and located at the peripheral rim, over which any liquids falling on the top surface are caused to run off into the tank beneath the plate.

13. Equipment as in claim 12, wherein the carousel further comprises at least one of a rotary filling and capping plate positioned above the revolving support plate, keyed similarly to the rotating shaft, and having a plurality of at least one of dispensing and closing devices each positioned in alignment with a relative peripheral station of the support plate and serving to at least one of fill the respective container being processed and close the container with a cap.

14. Equipment as in claim 13, wherein the at least one of the rotary filling and the capping plate includes top surface angled downwardly from a respective central area with which the shaft is associated, toward a peripheral area around which the at least one of the dispensing and closing devices are located.

15. Equipment as in claim 14, wherein the at least one of the rotary filling and the capping plate also includes a bottom surface directed toward the top surface of the support plate and angled downwardly from the peripheral area toward the central area.

16. Equipment as in claim 15, wherein the at least one of the rotary filling and the capping plate has a cross section of substantially rhomboid geometry.

17. Equipment as in claim 16, comprising a plurality of carousels, each associated with a respective base frame and with a respective collection tank, wherein the peripheral edges of the tanks are joined in fluid-tight association one with another.

18. Equipment as in claim 17, comprising a casing surface directed toward the carousels and coinciding with the bottom walls of the single tanks.

19. Equipment as in claim 18, wherein the mechanism for inducing motion comprises a motor, and at least one transmission component positioned beneath the casing surface, coupled to the motor and placed between at least two frames so as to drive the shafts of the respective carousels.

20. Equipment as in claim 19, comprising a device inducing vertical motion, associated with the revolving support plate and with the at least one of the rotary filling and the capping plate, by which the at least one of the rotary filling and the capping plate is moved toward and away from the support plate.

21. Equipment as in claim 20, wherein the device inducing vertical motion comprises at least one pneumatic cylinder having a first end anchored to the support plate and insertable into a second end anchored to the at least one of the rotary filling and the capping plate.

22. Equipment as in claim 21, wherein the device inducing vertical motion further comprises a telescopic casing element of tubular embodiment, positioned around the shaft between the support plate and the at least one of the rotary filling and the capping plate, having a first portion associated with the support plate and a second portion associated with the at least one of the rotary filling and the capping plate.

23. Equipment as in claim 22, wherein the first portion and the second portion of the telescopic element are coupled in fluid-tight association, with the first portion insertable into the second portion.

24. Equipment as in claim 23, wherein the substantially cylindrical body comprises a side wall having an opening through which access is afforded to an inside of the cylindrical body.

* * * * *